United States Patent Office.

PHILANDER TOLMAN, FRANKLIN WALKER, AND JOHN W. CASWELL, OF HARRISON, MAINE.

COMPOSITION FOR TREATING IRON WIRE.

SPECIFICATION forming part of Letters Patent No. 264,971, dated September 26, 1882.

Application filed January 13, 1882. (No specimens.)

*To all whom it may concern:*

Be it known that we, PHILANDER TOLMAN, FRANKLIN WALKER, and JOHN W. CASWELL, of Harrison, in the county of Cumberland and State of Maine, have invented certain new and useful Improvements in Compositions for Treating Iron Wire; and we do hereby declare that the following is a full, clear, and exact description of the invention, which will enable others skilled in the art to which it appertains to make and use the same.

Our invention has for its object to provide a composition of materials for the sizing or coating of metal or wire preparatory to its being drawn out into the various dimensions in which wire is usually made. The object of the coating or sizing is to obviate friction as the metal is drawn through the dies or apertures for the formation of the wires of the various diameters. Rye-meal has heretofore been used for this purpose. The manner of employing rye-meal has been to mix the same with a sufficient quantity of water, allow the compound to ferment, and then place the wires to be drawn into it for the required length of time. Then dry them in order to perfectly form the coating on the metal. Our composition is an improvement upon this, and is, besides, considerably cheaper.

Our compound is as follows: Of a desired quantity of the coating compound we take, first, sufficient of ground or chemically-manufactured wood pulp to constitute about six-eighths. To this we then add one-eighth of rye meal or flour. The remaining one-eighth is nearly made up of glue or any similar adhesive mixture or article. Starch can be used. Sufficient water is supplied to give the mixture the proper consistency. When used for the coarser wires the compound is of the thickness or stiffness of thin mortar, or somewhat nearer a liquid condition. When used for the finer wires the compound is of a watery consistency. A little yeast is added to start the fermentation. Mix the ingredients well and allow them to stand for some hours—from twenty-four to thirty-six hours. If prepared over night, the compound will be usually ready for use on the following evening. The iron or wire to be worked is then placed in the composition thus prepared and moved around therein until thoroughly wet and coated by the same. It is then hung up to drip. It is then subjected to a drying-heat for a period of about twelve hours. When this is done the metal is ready for working. About eight or ten hours will be sufficient for the drying. The compound, with careful mixing, can be used without fermentation.

What we claim as our invention, and desire to secure by Letters Patent, is—

The composition of substances herein specified, when mixed and prepared as set forth—to wit, wood pulp, rye-meal, glue, yeast, and water in the proportions set forth.

In testimony that we claim the foregoing as our own we affix our signatures in presence of two witnesses.

PHILANDER TOLMAN.
    FRANKLIN WALKER.
    JOHN W. CASWELL.

Witnesses:
 CHARLES L. WALKER,
 RUFUS J. BLAISDELL.